E. M. Stevens,

Pegging Machine,

No. 2,447, Reissued Jan. 8, 1867.

Witnesses
J. P. Peyton,
Theodore Lang

Inventor;
E. M. Stevens,
By Baldwin Hew alty

N. PETERS, PHOTO-LITHOGRAPHER, WASHINGTON, D. C.

United States Patent Office.

WILLIAM N. ELY, OF STRATFORD, CONNECTICUT, ASSIGNEE OF EDGAR M. STEVENS.

*Letters Patent No.* 2,018, *dated August* 6, 1861; *reissue No.* 2,447, *dated January* 8, 1867.

HAND PEGGING MACHINE.

The Schedule referred to in these Letters Patent and making part of the same.

TO ALL WHOM IT MAY CONCERN:

Be it known that I, EDGAR M. STEVENS, of Medford, in the county of Middlesex, and State of Massachusetts, have invented certain improvements in Hand Machines for Pegging Boots and Shoes, which I have assigned to WILLIAM N. ELY, of Stratford, Connecticut, and of which the following is a full, clear, and exact description reference being had to the accompanying drawings, making a part of this specification, of which—

Figure 2:
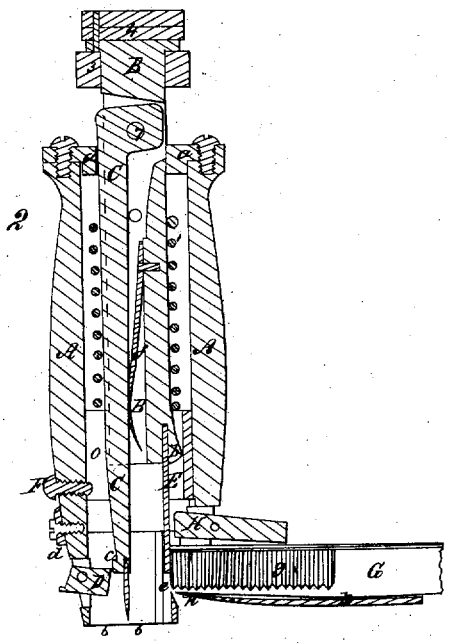
Figure 2 is a like view, including only a part of the peg-trough, and with the awl ascending.
Figure 1:
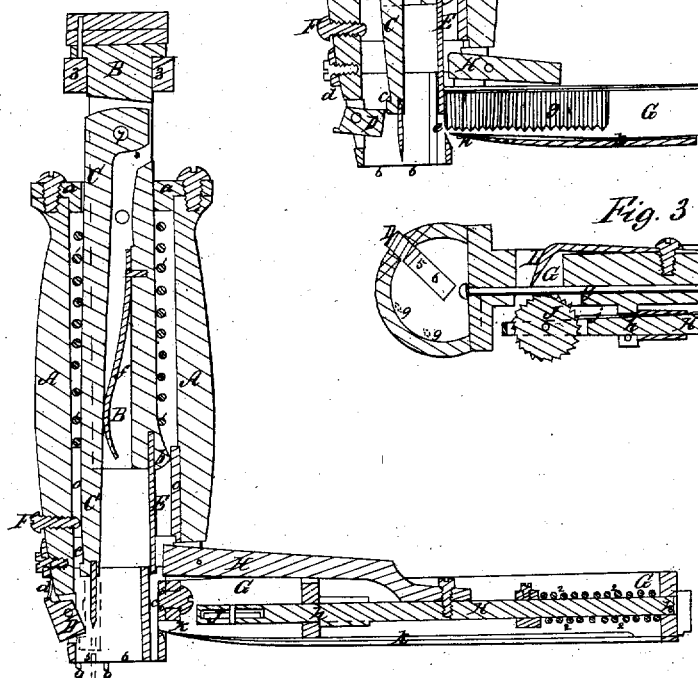
Figure 1 is a longitudinal section, including the peg-trough and with the awl descending.
Figure 3:
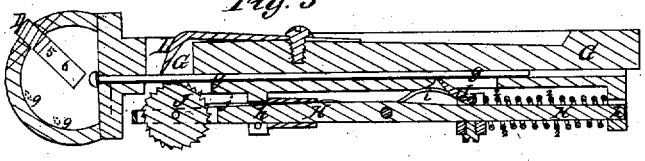
Figure 3 is a horizontal section of the peg-trough seen from above.

I am aware that automatic feeding points have been used before in hand peggers by W. W. Batchelder and Charles Keniston; but in each case these points have been distinct instruments separate from the awl and driver or plunger; but I am not aware that any hand pegging machine has ever heretofore been moved along upon the shoe by means of the awl as a feeding instrument. I am also aware that peg-wood strips have been fed to the driver before now, but not in the manner hereinafter described. I am not aware of any hand machine heretofore made which would enable the operator to regulate the spaces between the peg-holes, or regulate the throw of the feeding instrument for that purpose.

My invention has for its object, first, making the awl the feeding instrument; second, regulating the movements of the feeding point so as to control the spaces between the pegs; third, making the awl and peg-driver in two pieces, and so uniting them to a plunger as that while both rise and descend together, one of them shall have a lateral motion for the purpose of feeding the machine to the work; fourth, feeding the peg-wood forward continuously by the action of the plunger or peg-driver as the holes are made.

The following is a description of the machine: A A is the handle body, made cylindrical and hollow, and having a cap, *a a*, screwed on its top. B B is the plunger, which passes through the cap, having its head surmounted with leather at 4. 3 3 is a band of rubber under the head of the plunger. *b* is a small cam projection on the rear lower end of the plunger for operating the feed of the peg-wood. 1 1 1 1 is a spiral spring encircling the plunger in the cavity of the handle, and confined between the cap and a shoulder or ring, *o o*, in the lower part of the cavity. C C is the awl-holder pivoted to the plunger at 7, and having a small notch or shoulder near its lower end at *c*. D is a small pawl or dog pivoted in the handle body at 8, and having a small spring, *d*, to prevent its being thrown too far out, and to aid in driving it downwards and inwards, so that its lowermost inner corner shall take into and against the shoulder *c* of the awl-holder, after it has passed down, and force it back in its ascent the distance of a space between the holes. 5 is the descending point of the awl; it ascends at 6. E is the peg-driver attached to the plunger. *e* is the peg-tube. F is a set-screw for regulating the swing of the awl. *f* is a spring for throwing the awl-holder forward against F when released from D. G G is the peg-trough and *g g* the peg-wood. H H is a forked rod supported in bearings at *h h*, and driven backwards by the cam *b*, on the plunger, and forwards by the spiral spring 2 2, and feeds forward the peg-wood by means of the small pawl I, pivoted in H H, with its spring, *i*, pressing its point down on the peg-wood *g*; toothed wheels, with springs, J *j*, may be used instead. K is a small stationary knife-blade for cutting off the pegs as the wood is fed forward. *k* is a spring to keep the peg-wood from falling. L is a spring, pointed to prevent any retraction of the peg-wood. *q q* are guides against the edge of the leather, which may be made adjustable.

The mode of operation is as follows: On striking the plunger the awl descends in a perpendicular line into the leather at the point 5. As it retracts by the force of the rubber band, 3, and spiral spring, 1, the lower corner of the pawl D engages in the notch *c* of the awl-holder, and the machine is thrown forward so that the awl rises out of the leather and into the machine at 6, by that time advanced to where 5 had been. The instrument is thus advanced or fed along one space at a time. The awl being freed from the pressure of D, when it again descends, will enter the leather at the place to which the point 5 has advanced, being one space. In this manner the awl is the feeding instrument, and the machine is moved along upon the material by the action of the awl. The throw of the awl and the feeding of the machine, so as to regulate and control the distances between the pegs, are regulated by the set-screw F, which allows a greater or less swing to the awl, as desired.

As the plunger is driven down, the small cam *b* driven against the forked rod H forces it back the width of a peg. As H passes back the pawl I slides back over the peg-wood, which is prevented from retracting by the forward pressure of the point of the spring L. As soon as the cam *b* has acted upon H and returned, the spiral spring 2 drives H forward again, when the point of the pawl I presses against the peg-wood and feeds it along a peg at a time into the peg-tube *e*, where the next downward motion of the peg-driver E upon it splits the peg off against the knife-blade K, and drives it into the hole last before made by the awl. When the toothed wheel J is used, it is revolved as H is forced back in an opposite direction, and on the next advance of the rod the wheel is held stationary by the spring *j*, and its teeth engaging with the peg-wood, feed it along as required. The peg-driver descends perpendicularly and drives the peg into the hole over which it has advanced. Different devices may be used for varying the position of the awl, and feeding the machine thereby, by means of cams and springs, &c., but I have preferred the one described.

What I claim as my invention in hand pegging machines, which move upon the work, and desire to secure by Letters Patent, is—

1. Feeding the machine forward upon the work by means of the awl, or a piercing instrument, substantially as described.

2. Graduating the spaces between the peg-holes by regulating the throw of the awl, substantially as described.

3. Making the awl and peg-driver in two pieces, and uniting them to a plunger, so that whilst both rise and descend together, one of them shall have a lateral motion, for the purpose of feeding the machine to the work, substantially as described.

4. Feeding forward the peg-wood by means of the action of the plunger, in combination with the device I, or its equivalent, substantially as described.

E. M. STEVENS,

Witnesses:
W. M. PARKER,
N. A. DYAR.